US008862701B2

(12) United States Patent
Havriluk

(10) Patent No.: US 8,862,701 B2
(45) Date of Patent: Oct. 14, 2014

(54) COMMUNICATION NETWORK UTILIZING EMAIL OR WEB ADDRESSES THAT DESCRIBE A PHYSICAL LOCATION

(76) Inventor: George Havriluk, Anaheim Hills, CA (US)

(*) Notice: Subject to any disclaimer, the term of this patent is extended or adjusted under 35 U.S.C. 154(b) by 324 days.

(21) Appl. No.: 12/880,367

(22) Filed: Sep. 13, 2010

(65) Prior Publication Data

US 2011/0072095 A1  Mar. 24, 2011

Related U.S. Application Data

(60) Provisional application No. 61/244,832, filed on Sep. 22, 2009.

(51) Int. Cl.
*G06F 15/16* (2006.01)
*G06F 15/177* (2006.01)
*G06F 17/30* (2006.01)
*H04L 29/08* (2006.01)
*H04L 12/58* (2006.01)
*G06Q 30/02* (2012.01)

(52) U.S. Cl.
CPC .......... *H04L 51/28* (2013.01); *G06F 17/30528* (2013.01); *H04L 67/18* (2013.01); *H04L 12/58* (2013.01); *G06Q 30/02* (2013.01); *H04L 51/16* (2013.01); *H04L 51/20* (2013.01)
USPC .......................................... 709/220; 709/206

(58) Field of Classification Search
USPC ................................................. 709/206, 220
See application file for complete search history.

(56) References Cited

U.S. PATENT DOCUMENTS

| 5,848,373 | A  | * | 12/1998 | DeLorme et al. | 701/455 |
| 6,591,296 | B1 | * | 7/2003 | Ghanime | 709/224 |
| 7,571,211 | B1 | * | 8/2009 | Melick et al. | 709/206 |
| 2005/0259658 | A1 | * | 11/2005 | Logan et al. | 370/392 |
| 2005/0288035 | A1 | * | 12/2005 | Wang | 455/456.1 |
| 2008/0200143 | A1 | * | 8/2008 | Qiu et al. | 455/404.2 |
| 2008/0284587 | A1 | * | 11/2008 | Saigh et al. | 340/539.13 |
| 2008/0288395 | A1 | * | 11/2008 | Srinivasan et al. | 705/39 |
| 2009/0003346 | A1 | * | 1/2009 | Kramer et al. | 370/392 |
| 2009/0137222 | A1 | * | 5/2009 | Heen | 455/404.1 |
| 2009/0170538 | A1 | * | 7/2009 | Shrivathsan et al. | 455/466 |
| 2009/0285205 | A1 | * | 11/2009 | Melick et al. | 370/352 |
| 2010/0020942 | A1 | * | 1/2010 | Olshansky et al. | 379/45 |
| 2010/0077037 | A1 | * | 3/2010 | Turakhia | 709/206 |
| 2010/0172345 | A1 | * | 7/2010 | Bjorsell et al. | 370/352 |
| 2010/0180323 | A1 | * | 7/2010 | Matteini et al. | 726/5 |
| 2011/0069661 | A1 | * | 3/2011 | Waytena et al. | 370/328 |
| 2011/0314208 | A1 | * | 12/2011 | Feinberg et al. | 711/103 |

* cited by examiner

*Primary Examiner* — Ebrahim Golabbakhsh
(74) *Attorney, Agent, or Firm* — Larry E. Severin

(57) ABSTRACT

A communication network utilizing email or web addresses that describe a physical location includes a network for communicating a message to a user, the message having an electronic address that identifies a physical location; a module to send the message to the user utilizing the electronic address; a module for the user to read the message utilizing the electronic address; and a module to identify the user utilizing the physical location. The electronic address may be an email address or a website address, and the description of the physical location may be a nine-digit zip code or a latitude and longitude.

13 Claims, 4 Drawing Sheets

COMMUNICATION NETWORK UTILIZING EMAIL OR WEB ADDRESSES THAT DESCRIBE A PHYSICAL LOCATION

RELATED APPLICATIONS

This application claims the benefit of the filing date of U.S. patent application Ser. No. 61/244,832, filed Sep. 22, 2009, which is incorporated herein by reference in its entirety.

BACKGROUND OF THE INVENTION

The present invention generally relates to communication and more specifically to a communication network utilizing email addresses or web addresses that describe a physical location.

Currently, email addresses are not easily used for marketing because there is no systematic way to determine the physical location of an e-mail address owner, to track personal preferences, or to reflect change of physical address of the email address owner.

It would be desirable to have a system that incorporates technologies requiring few people to operate, that is fast, efficient and inexpensive, which is trackable by physical address.

SUMMARY OF THE INVENTION

In one aspect of the present invention, a system includes a network for communicating a message to a user, the message having an electronic address that identifies a physical location; a module to send the message to the user utilizing the electronic address; a module for the user to read the message utilizing the electronic address; and a module to identify the user utilizing the physical location.

In another aspect of the present invention, a communications network includes a module to send a message to a user utilizing an electronic address, the electronic address including a description of a physical location associated with the user; a module for the user to read the message utilizing the electronic address; and a module to identify the user utilizing the description of the physical location.

In yet another aspect of the present invention, a method for communicating a message includes utilizing a computer to send a message to a user, the message having an electronic address that identifies a physical location; utilizing the electronic address to read the message; and utilizing the physical location to identify the user.

Figure 1:
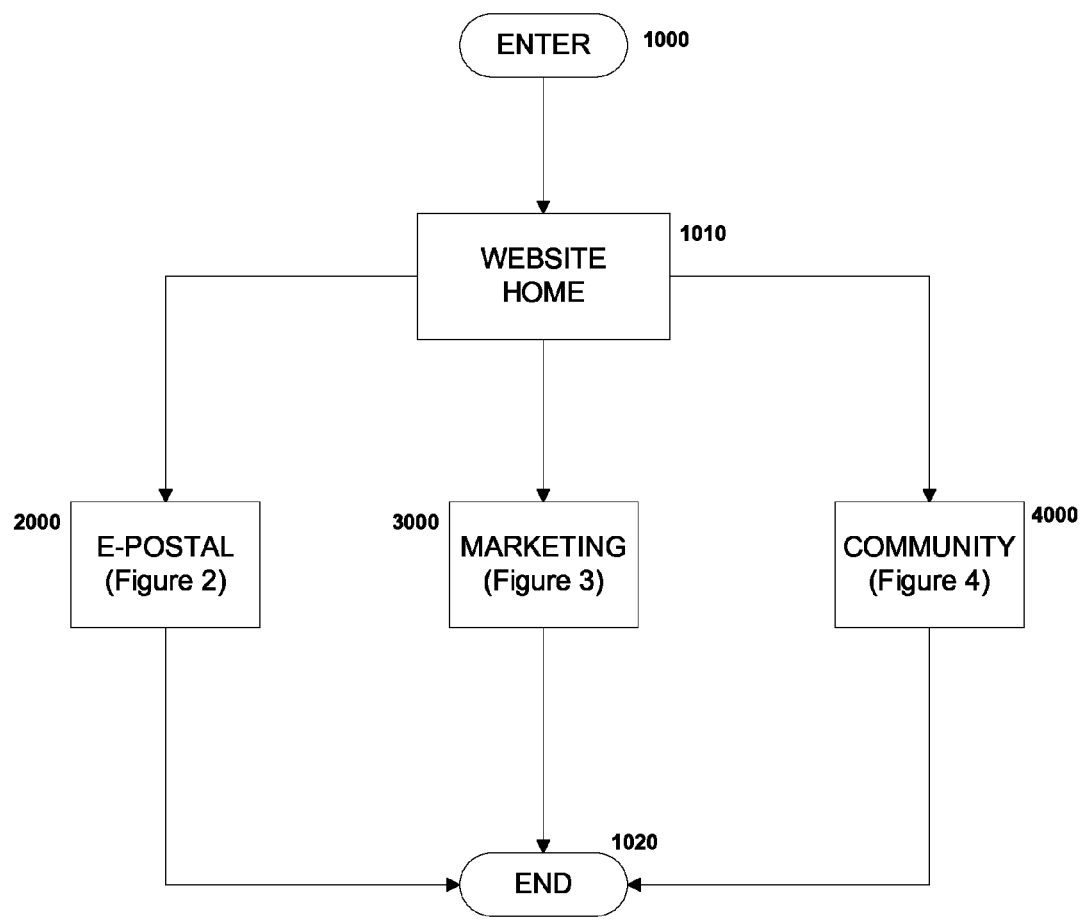
FIG. 1 depicts a flow chart of an embodiment of the present invention.
Figure 2:
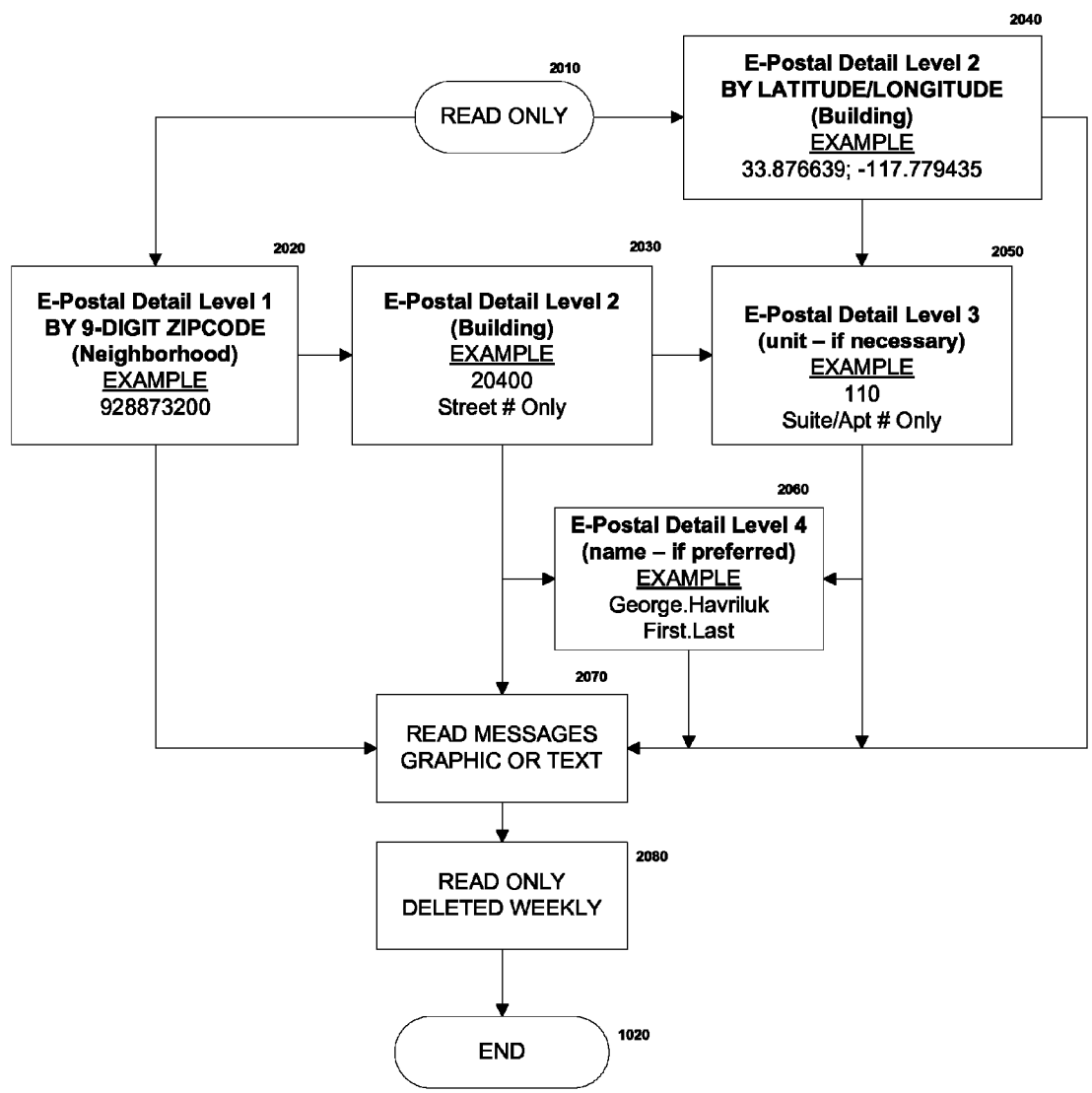
FIG. 2 depicts a flow chart of the e-postal module of the embodiment of FIG. 1.
Figure 3:
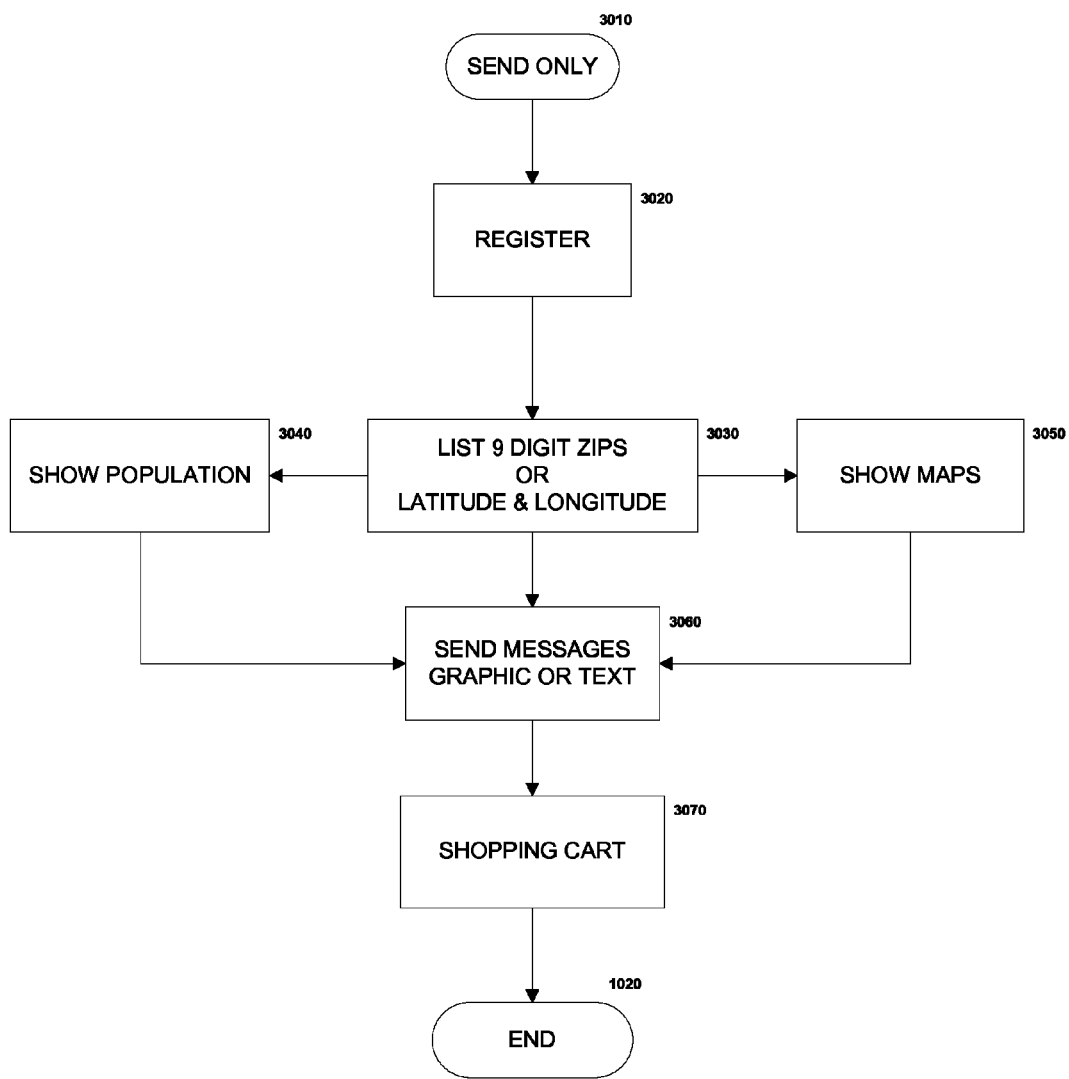
FIG. 3 depicts a flow chart of the marketing module of the embodiment of FIG. 1.
Figure 4:
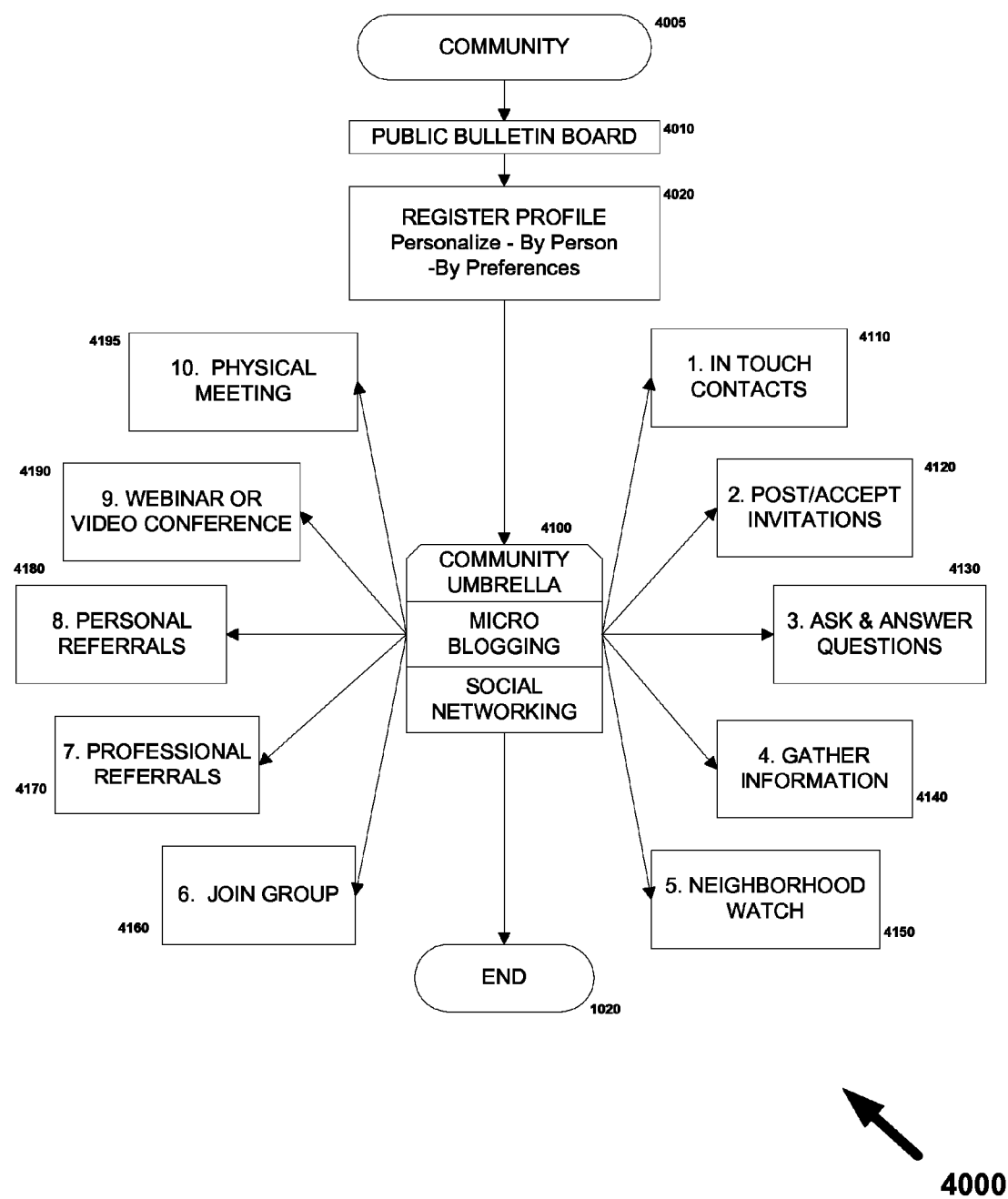
FIG. 4 depicts a flow chart of the community module of the embodiment of FIG. 1.

An embodiment may be performed by computer servers.

Other embodiments may be used for database collection, collection of census information, electronic voting, collection of consumer/business list information, or as alternatives to traditional email marketing systems.

Embodiments may produce lists of information useful for local and national opt-in database marketing for residential/business by geographical and/or opt-in individual preferences. Other embodiments may be for emergency notification during natural disasters.

Embodiments may include a method for a virtual cloud communication network based on unique physical geographical locations as defined by 9-digit zip codes and/or latitude and longitude coordinates, including email/web marketing, social networking and micro blogging. The unique email/web address may include a group of fields related to a physical location, the fields selected from the group consisting of: name, street number, suite/apt. number, 9-digit zip code, and latitude/longitude, the method comprising: including in the email address, delimiters to distinguish between the fields; concatenating the fields and delimiters into a single unique email/web address; associating at least one of the fields with a physical location; and utilizing the unique email/web address and the physical location in association with communicating an email/web message, e-notification.

I claim:

1. A system for communicating with a user over a network, comprising:

a computer that associates the user with a first level of identification having the user's preference of a nine-digit zip code or latitude and longitude coordinates of a physical location, and that further associates the user with a second level of identification having one or more of: an address number of a place, a suite or apartment number, and a person's name;

a module that sends a first message to the user over the network by individually identifying the user utilizing the first and second levels of identification, and that sends a second message to the user and other network users over the network by identifying the user and other network users utilizing only the first level of identification; and a website for the user to access the system to view the messages, wherein the user accesses the website by visiting an electronic address having a domain name combined with one or more text fields that indicate the first and second levels of identification.

2. The system of claim 1, wherein the website allows the user to access modules for social networking and micro blogging.

3. The system of claim 1, wherein the system identifies users based upon the first level of identification associated with the users, thereby providing a community tied together by geographical location.

4. The system of claim 1, wherein the system identifies communities of multiple users based upon the first level of identification associated with the users, and provides social networking between the users in the same communities.

5. The system of claim 1, wherein the user pre-registers with the system by providing a first identifying information at the first level of identification, and then if the first identifying information does not uniquely identify the user, providing a second identifying information at the second level of identification.

6. The system of claim 1, wherein the latitude and longitude coordinates have exactly 6 digits of precision to the right of the decimal point, thereby helping provide a consistent format for the electronic address.

7. A system for communicating with a user over a network, comprising:

a computer that pre-registers the users by associating the user with a first level of identification that describes a physical location with the user's preference of a nine-digit zip code or latitude and longitude coordinates that have exactly 6 digits of precision to the right of the decimal, and if the first level of identification does not uniquely identify the user, further associating the user with a second level of identification having one or more of: an address number of a place, a suite or apartment number, and a person's name;

a module that identifies geographical communities of multiple users based upon the first level of identification associated with the users, and provides social networking between the users in the same communities;

a module that sends a first message to the user over the network by individually identifying the user utilizing the first and second levels of identification, and that sends a second message to the user and other network users over the network by identifying the user and other network users utilizing only the first level of identification; and a website for the user to access the system to view the messages and for social networking, wherein the user accesses the website by visiting an electronic address having a domain name combined with one or more text fields that indicate the first and second levels of identification.

8. A method for communicating with a user over a network, comprising:

utilizing a computer system to associate the user with a first level of identification having the user's preference of a nine-digit zip code or latitude and longitude coordinates of a physical location, and further associating the user with a second level of identification having one or more of: an address number of a place, a suite or apartment number, and a person's name;

sending a first message to the user over the network by individually identifying the user utilizing the first and second levels of identification, and sending a second message to the user and other network users over the network by identifying the user and other network users utilizing only the first level of identification; and accessing a website to view the messages by visiting an electronic address having a domain name combined with one or more text fields that indicate the first and second levels of identification.

9. The method of claim 8, wherein the website allows the user to access modules for social networking and micro blogging.

10. The method of claim 8, wherein the system identifies users based upon the first level of identification associated with the users, thereby providing a community tied together by geographical location.

11. The method of claim 8, wherein the system identifies communities of multiple users based upon the first level of identification associated with the users, and provides social networking between the users in the same communities.

12. The method of claim 8, wherein the user pre-registers with the system by providing a first identifying information at the first level of identification, and then if the first identifying information does not uniquely identify the user, providing a second identifying information at the second level of identification.

13. The method of claim 8, wherein the latitude and longitude coordinates have exactly 6 digits of precision to the right of the decimal point, thereby helping provide a consistent format for the electronic address.

* * * * *